United States Patent [19]

Choi et al.

[11] 4,078,973

[45] Mar. 14, 1978

[54] LOOP PYROLYSIS PROCESS FOR ORGANIC SOLID WASTES

[75] Inventors: Charles K. Choi, Claremont; Robert W. Frischmuth, Huntington Beach; Richard M. Gundzik, Placentia; Joseph P. Tassoney, Diamond Bar, all of Calif.

[73] Assignee: Occidental Petroleum Corporation, Los Angeles, Calif.

[21] Appl. No.: 719,272

[22] Filed: Aug. 31, 1976

Related U.S. Application Data

[63] Continuation-in-part of Ser. No. 704,555, Jul. 12, 1976, abandoned, which is a continuation of Ser. No. 603,870, Aug. 11, 1975, abandoned.

[51] Int. Cl.² ............... C10B 49/16; C10B 53/02
[52] U.S. Cl. ............... 201/21; 48/209; 201/2.5; 201/12; 201/22; 201/25; 201/28; 201/33; 201/42; 202/99
[58] Field of Search ............... 201/2.5, 3, 4, 7, 8, 201/10, 12, 13, 14, 15, 16, 20, 21, 25, 28, 29, 30, 31, 32, 37, 42, 22, 27, 33, 34, 36; 202/96, 99, 85, 86, 87, 91, 93, 108, 121, 208, 211, 215; 48/111, 209, 197 A

[56] References Cited

U.S. PATENT DOCUMENTS

| | | | |
|---|---|---|---|
| 2,560,403 | 7/1951 | Arveson | 48/202 |
| 2,608,526 | 8/1952 | Rex | 201/31 X |
| 2,741,549 | 4/1956 | Russell | 48/206 |
| 3,167,494 | 1/1965 | Crawford | 208/8 |
| 3,251,751 | 5/1966 | Lindahl et al. | 201/12 |
| 3,322,521 | 5/1967 | Cockerham | 48/63 |
| 3,444,048 | 5/1969 | Schmeling et al. | 209/3 X |
| 3,574,065 | 4/1971 | Eddinger et al. | 201/12 |
| 3,655,518 | 4/1972 | Schmalfeld et al. | 201/12 X |
| 3,698,882 | 10/1972 | Garrett et al. | 48/210 |
| 3,736,111 | 5/1973 | Gardner et al. | 201/25 X |
| 3,736,233 | 5/1973 | Sass et al. | 201/22 X |
| 3,846,096 | 11/1974 | Mallan et al. | 48/209 |
| 3,853,498 | 12/1974 | Bailie | 201/2.5 X |
| 3,957,459 | 5/1976 | Mitchell et al. | 201/31 X |

FOREIGN PATENT DOCUMENTS

| | | |
|---|---|---|
| 1,353,067 | 5/1974 | United Kingdom. |
| 1,398,858 | 6/1975 | United Kingdom. |

Primary Examiner—Joseph Scovronek
Attorney, Agent, or Firm—Christie, Parker & Hale

[57] ABSTRACT

Particulate organic solid waste is pyrolyzed in the presence of an inert particulate source of heat and a carrier gas in a pyrolysis reactor to form a carbon containing solid residue of pyrolysis, pyrolytic oils and gases. The particulate source of heat and carbon containing solid residue of pyrolysis are separated from the product stream. The particulate source of heat and carbon containing solid residue of pyrolysis are transported to a combustion zone where through partial or total combustion. The particulate source of heat is reheated to a temperature requisite for feed to the pyrolysis reactor with attendant generation of additional particulate source of heat.

16 Claims, 1 Drawing Figure

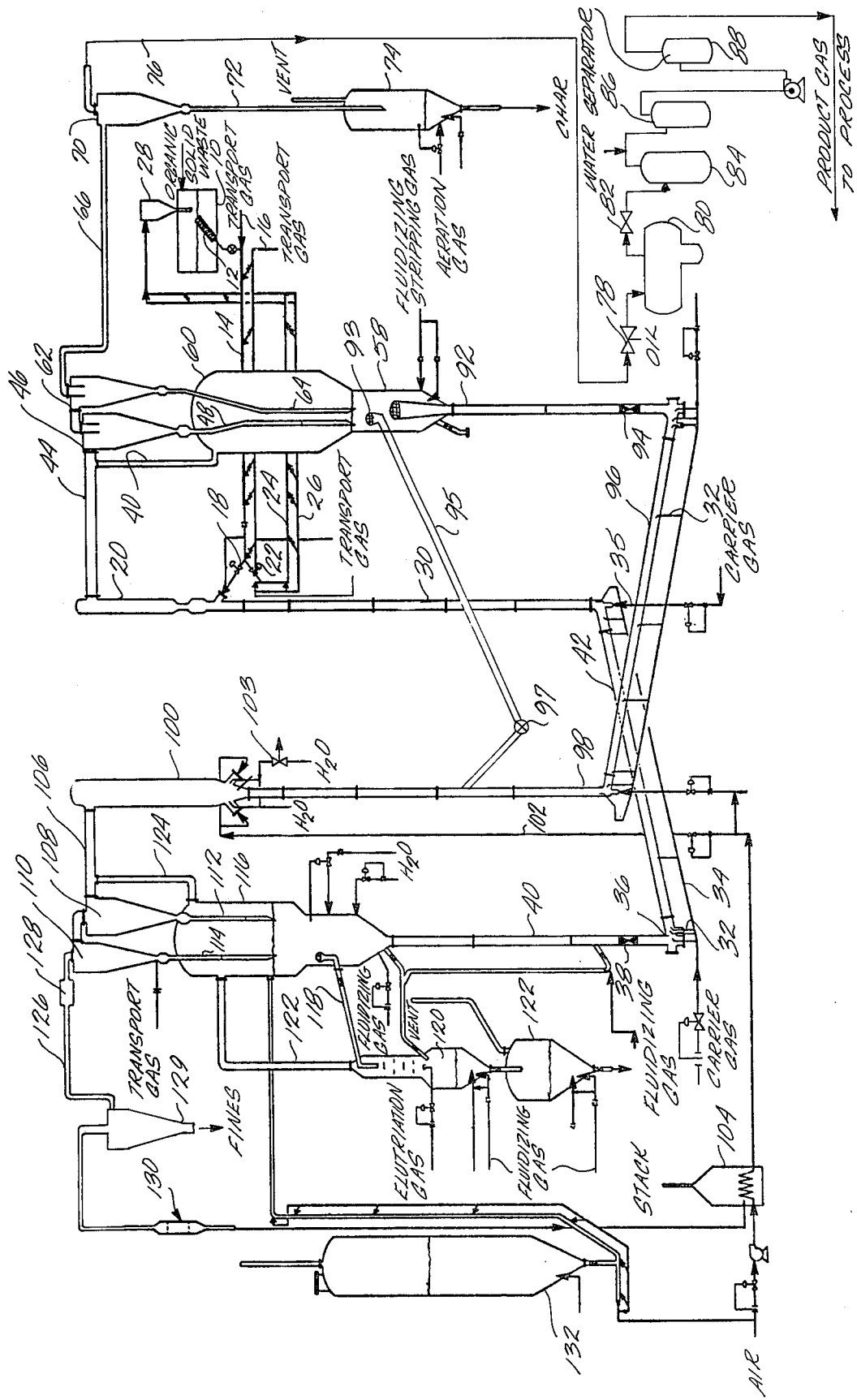

LOOP PYROLYSIS PROCESS FOR ORGANIC SOLID WASTES

CROSS REFERENCE TO RELATED APPLICATIONS

This is a continuation-in-part of our Application Ser. No. 704,555 filed July 12, 1976 now abandoned which is a continuation of Application Ser. No. 603,870 filed Aug. 11, 1975 now abandoned.

BACKGROUND OF THE INVENTION

The present invention is directed to the pyrolysis of organic solid wastes from industrial and municipal sources.

The disposal of wastes both from municipal and industrial sources, such as trash, rubbish, garbage, animal wastes, agricultural wastes, and waste of plastic processing operations is rapidly becoming of immense national concern. The cost of disposal ranks third behind public schooling and highways as municipal expense in the United States.

It is estimated that each individual in the country generates between 4 and 6 pounds of waste per day, that the industrial output is equivalent to approximately 5 pounds of solid waste per person per day. Previous methods of mass waste disposal, such as landfill, are becoming impossible, while others such as incineration are costly and result in air pollution problems.

A vast majority of the waste which is presently disposed of contains products which are immediately recyclable back into the economy or products into which the waste can be converted for recycle back to the economy. Directly recyclable constituents are the various metals present, such as aluminum and steel, and glass. For the most part, the organic solid waste fraction may be subject to a flash pyrolysis as an operation independent of recovery of the directly recyclable inorganic fraction and any organic portion recovered as pulp. Flash pyrolysis yields char, pyrolytic oil and gases as products.

SUMMARY OF THE INVENTION

According to the present invention, there is provided an essentially closed loop process for controlled pyrolysis of solid organic waste.

In the process of the invention, particulate organic solid waste dried to a transportable state and a particulate source of heat and a nondeleterious carrier gas are combined and passed under turbulent flow conditions through a transport, flash pyrolysis zone where solid organic waste is converted to carbon containing solid residue of pyrolysis, pyrolytic oils and gases. The heat required for pyrolysis is supplied by the particulate source of heat which is the carbon containing solid residue of pyrolysis and/or an inorganic solid heat source formed from decarbonization of the carbon containing solid residue of pyrolysis.

Following pyrolysis, the particulate source of heat and formed carbon containing solid residue of pyrolysis are separated from the product gas and passed to a first particles collection zone. The first particles collection vessel supplies the carbon containing solid residue of pyrolysis or a representative mixture of the formed carbon containing solid residue of pyrolysis and particulate source of heat to a first loop through which the particulate mixture is transported under fluidized conditions to a transport decarbonization zone. The loop includes a fluidized leg in which particles are maintained at a height sufficient to provide a pressure at the base greater than the operating pressure of the decarbonization zone. In the decarbonization zone, all or a portion of carbon containing solid residue of pyrolysis is oxidized to raise the resultant mixture to a temperature requisite for feed to the pyrolysis zone.

The particulate source of heat is separated from the flue gas of the burner and collected in a second fluidized particles collection vessel. Particles are fed from the second fluidized particles collection vessel to a second loop in which the particles are transported at high temperatures to the pyrolysis reactor. Again the loop includes a fluidized leg which provides at its base a pressure greater than the operating pressure of the pyrolysis zone.

In the flash transport pyrolysis process of the invention, the particulate solid organic waste may include particulate inorganic constituents. The carrier gas is nondeleteriously reactive with respect to the pyrolysis products. The pyrolysis zone is maintained at a temperature between about 600° F and the introduction temperature of the particulate source of heat to the pyrolysis zone preferred temperatures are from about 600° F to about 2000° F or below the sintering temperature of the inorganic solid heat source formed from decarbonization of the carbon containing solid residue of pyrolysis which is the preferred particulate source of heat. In the later instance, the preferred pyrolysis temperature is from about 600° to about 1700° F. More preferably, the pyrolysis temperature is from about 800° to about 1400° F. To maximize fluidized particle density where the inorganic solid heat source is employed, the carbon containing solid residue of pyrolysis is decarbonized to the extent of becoming at least about 90% carbon free.

In the pyrolysis process, the solid organic waste exists as discrete particles having a diameter less than one inch, and are preferably of a size less than about 5 mesh, more preferably, less than 8 mesh. The particulate inert source of heat which is the carbon containing solid residual pyrolysis and/or the inorganic solid heat source formed from decarbonization of the carbon containing solid residue of pyrolysis for ease of mass transport and transfer of heat to the organic solid waste undergoing pyrolysis, is generally of a particle size in the range from about 10 to about 2,000 microns and preferably from about 20 to about 1000 microns.

Although any carrier gas which is nondeleterious, i.e., essentially oxygen free, to the products of pyrolysis may be used as a transport gas for both the organic solid waste and the particulate source of heat, it is preferred for expediency in the process to use the gases which are the by-products of the pyrolysis process itself. The principal constituents of such a gas are the oxides of carbon.

Residence time during pyrolysis is generally less than 10 seconds, preferably from 0.1 to 2 seconds, and more preferably, from about 0.1 to 1 second. Residence time in the burner is also less than 10 seconds, preferably from 0.1 to 2 seconds and more preferably from about 0.2 to 0.4 second. The carbon containing solid residue of pyrolysis is to be recycled as the primary particulate source of heat. In any instance, it is desirous to maximize the $CO_2$ to $CO$ ratio in the effluent gas.

The weight ratio of the particulate source of heat to organic solid waste fed to the pyrolysis zone will vary depending upon temperature of the particulate source of heat and the temperature desired in the pyrolysis zone. To achieve requisite temperatures from about 2 to about 10 or more, preferably from about 4 to about 6 pounds of heat per pound of the comminuted antecedent organic solid waste is fed to the pyrolysis zone. Pyrolysis results from heating of the solid waste primarily by solid to solids heat transfer with some solid to gas to solid heat transfer occurring. To achieve this, turbulent flow conditions are required. Reynolds flow index numbers, therefore, will exceed 2,000 with Reynolds numbers in excess of 50,000 frequently employed.

The Drawing

The attached drawing schematically illustrates the pyrolysis process of this invention and apparatus associated with its use.

DETAILED DESCRIPTION

There is provided in accordance with the practice of this invention an essentially closed loop process for the pyrolysis of the organic solid waste fraction of municipal and industrial wastes.

As used herein, the term "organic solid wastes" means the predominately organic portion derived from as received waste source, domestic and/or industrial in origin after gross separation into an inorganic constituent such as iron, aluminum, glass and other values including paper pulp. Because the several comminuting operations attendant to the gross separation, there may appear in the organic solid waste fraction some particulate inorganic solids such as glass metals and amounting to and from about 5 to 8% by weight (dry basis) of the organic solid waste. In municipal waste the inorganics are predominately glass. The inorganic fraction constituents, except for lost or removed fly ash, becomes the inorganic solid heat source or "ash" formed upon decarbonization of the carbon containing solid residue of pyrolysis as described below.

The organic constituents of the organic solid wastes include cellulosic materials, plastic, rubber stock, and animal waste. Included in the meaning of "cellulosic materials" are paper, tree trimming and bark, sawdust, crop waste, vegetable and fruit processing waste, and the like. "Plastics" include discarded household plastics, as well as the waste of industrial polymer forming and processing operations. ♭Rubber stock" includes waste tires. "Animal wastes" include household discards, slaughter house wastes, poultry processing wastes, manure and the like.

Resulting from a generally sundry mixture of waste materials after gross separating substantially inorganic values, the organic solid waste may have, after drying to the extent prepared for transport to a pyrolysis reactor, the following typical analysis:

Table 1

| Constituent | % by Weight |
| --- | --- |
| Organics | 92.29 |
| Metals | 0.38 |
| Glass | 1.69 |
| Other Inorganics | 2.02 |
| Water | 3.62 |

The metals, glass and other inorganics constitute "ash".

When the organic solid waste is pyrolyzed, there is formed a mixture of carbon containing solid residue of pyrolysis, termed herein "char", pyrolytic oils and gas. The gas includes transport gas and gases resulting from pyrolysis. The gas on a dry basis consists primarily of the oxides of carbon and hydrogen, and light hydrocarbons.

The carbon containing solid residue of pyrolysis, termed herein "char", contains combustibles which are carbonaceous in nature, the main constituent of the carbonaceous matter being carbon, in intimate admixture with the particulate inorganics. The carbon containing solid residue of pyrolysis, depending on the waste source may contain from about 50 to about 70% inorganics, the balance being carbonaceous in nature, i.e., mainly carbon with some hydrogen and oxygen being present. Bulk density of the carbon containing solid residue of pyrolysis or char is from about 5.5 to 12.5 lbs./cu. ft.

The inorganic solid heat source or as termed herein "ash" which is formed by decarbonization of the char has, in contrast, after 90% or more carbon removal, a bulk density between about 35 and 70 lbs./cu. ft. Its hard, glass like nature makes it an ideal heat source which may be readily generated from within the process itself. The ash has a fusion temperature between about 1425° and about 1700° F, and a particle and skeletal density of about 150 lbs./cu. ft. When used as a heat source, a major quantity of fly ash is removed. Typically when used the inorganic source of heat will contain less than 50% fly ash.

The pyrolytic oils formed while varying in nature depending upon the composition of the waste material processed and pyrolysis conditions employed are at the same time unique. They may be characterized as an oxygenated, complex organic fluid, typically up to 40% and in some cases up to 85% soluble in water, acids or base. Solubility in polar organic solvents such as glycerol is limited and the pyrolytic oils are relatively insoluble in nonpolar organic solvents, such as diesel oil, carbon tetrachloride, pentane, decane, benzene, toluene and hexane. The pyrolytic oil, however, can be successively blended and mixed with various #6 fuel oils. Combustion stability of the mixture is about the same as #6 fuel oil alone.

A typical example of an elemental analysis of the pyrolytic oil is that obtained from the pyrolysis of a waste material containing about 70% cellulosics. The oil thus obtained will contain from about 52 to about 60% carbon, from about 6 to about 8% hydrogen, from about 1 to about 2% nitrogen and from about 29 to about 33% oxygen. The empirical formula which best fits the pyrolytic oil analysis is $C_5H_8O_2$. Specific gravities are unusually high, ranging from about 1.1 to about 1.4.

By a "nondeleteriously reactive" carrier gas, there is meant a gas stream which is essentially free of free oxygen. Although constituents may react under nonoxidizing conditions with pyrolysis products to upgrade their value, to be avoided are constituents which degrade pyrolysis products.

The attached drawing illustrates the practice of the process of this invention, and apparatus associated with its use.

With reference thereto, the organic solid waste from which there has been a gross separation of inorganics and which has been dried, is comminuted to particles having a maximum particle dimension less than 1 inch, preferably a particle size less than 5 mesh, and more preferably less than 8 mesh, and stored in tank 10. The organic solid waste is conveyed at a desired rate by screw conveyor 12 to transport line 14. The solid organic waste is transported through transport line 14 as a concentrated fluidized mass using a transport gas, preferably product gas of the process to pyrolysis reactor 20. The transport gas is introduced directly to line 14 and at several points along its length from line 16. If organic feed rate is in excess of that required by the pyrolysis reactor 20, control valve 18 is closed and control valve 22 opened enabling a portion of solid organic waste to be returned by line 24, and separated from its transport gas, introduced by line 26, by cyclone 28 for return to tank 10.

Simultaneous with the introduction of the organic solid waste into pyrolysis reactor 20, there is introduced a particulate heat source along with its transport gas through vertical riser 30. The particulate heat souce may be any material capable of transferring heat to the organic solid waste to cause its pyrolysis into gases, pyrolytic oils and char. The preferred heat source is the carbon containing solid residue of pyrolysis or "char", the inorganic solid heat source derived from the decarbonization of the carbon containing solid residue of pyrolysis or "ash" and mixtures thereof. Ash derived from the decarbonization char is a particularly preferred heat source because it is relatively attrition free, and is of high bulk density minimizing the height for the fluidized leg or standpipe 40 essential to continuous operation without backflow at the pressure differential employed.

Pyrolysis reactor 20 is operated, depending upon the temperature and the nature of the particulate heat source, at an average exit temperature from between about 600 and the introduction temperatures of the particulate heat source to the flash pyrolysis reactor. Reactor temperature is essentially sustained by the particulate heat source. Where char is the source of heat, temperatures will range from about 600° to about 2000° F. Where ash is whole or in part is used as the source of heat, the upper temperature limit is ascertained by the fusion temperature of the ash which is between about 1425° and 1700° F. Ash, the preferred source of heat, requires, when used, depending on its fusion temperature, an operating temperature between 600° and 1700° F. The preferred pyrolysis temperatures are between about 800° and 1400° F.

In pyrolysis reactor 20, heat transfer occurs primarily by solids to solids with some solids to gas to solids heat transfer occurring. In general operation, organic solid waste feed temperature is approximately 100° F and its transport gas from ambient up to about 500° F. The preferred transport gas for both the organic solid waste and the particulate heat source is the gas resulting from the pyrolysis of the organic solid waste.

Pyrolysis occurs at some temperature intermediate of the temperature of the particulate heat source introduced into pyrolysis reactor 20 and the temperature of the feed. For minimum utilization of the particulate heat source the transport gas for the particulate heat source should approach its temperature.

The gas used to transport the solids laterally is introduced, in part, by a plurality of oriented nozzles 32 projecting from lateral gas line 34 at angle bend 36 beneath slide valve 38 of standpipe 40. Nozzles 32 project gas flow along angle riser 42 to urge the transported particles to vertical riser 30. At this point, there is added secondary transport gas through nozzle 35 which provides the final force to lift the solid particles under high flow rates to pyrolysis reactor 20.

Nominal operating pressure of pyrolysis reactor 20 is about 11 to 12 psig. Residence time during pyrolysis is generally less than 10 seconds, preferably from 0.1 to 2 seconds, and more preferably, from about 0.1 to 1 second. The weight ratio of the particulate heat source to organic solid waste will vary depending upon temperature of the particulate heat source and the temperature desired in the pyrolysis reactor 20. Generally about 2 to about 10 or more, preferably from 4 to 6 pounds of the particulate heat source per pound of the comminuted organic solid waste is fed to the pyrolysis reactor 20. To achieve intimate mixing turbulent flow conditions are required. Reynolds flow index numbers, therefore, will exceed 2,000 with Reynolds numbers in excess of 50,000 frequently employed.

Products of the pyrolysis, including the particulate heat source leave reactor 20 via line 44 and enters product cyclone 46 where heavy particles and particles of large diameter are separated. Particles settle through dipleg 48 into the constricted area 58 of stripper hopper 60. Finer dense particles and char particles are separated by cyclone 62 and are fed to hopper 60 through dipleg 64. Each dipleg has on its end a flap valve to prevent backflow of fluidizing gas in hopper 60 from interrupting the operation of cyclones 46 and 62. Cyclones 46 and 62 are designed to operate at a high efficiency to maximize separation of particles from the gas stream.

The residual gas stream which includes the condensible pyrolytic oils and product gases leave by line 66 and enter fines separator cyclone 70 where fine char particles are recovered. The fine char particles descent dipleg 72 into char bin 74 for recovery as product. Inert aeration gas at a low temperature is introduced at the base of char hopper 74 to cool the char and maintain the char in a free flowing semi-fluid state.

The residual gases, substantially free of fines, pass by line 76 to quench venturi scrubber 78 where by the introduction of a quench oil the pyrolytic oils are caused to condense from the gas stream and collect in vessel 80. A second quench venturi scrubber 82 is used to remove entrained pyrolytic oil which collects in settler 84. After scrubbing the gas in scrubber 86, and collection of residual condensates in separator 88 there is provided a product gas for use in the process. Excess gas may be flared to the atmosphere.

The char and the particulate heat source collect in zone 58 of hopper 60 and are maintained at a predetermined height as part of fluidized leg 92 by the rate of solids withdrawal. Aeration gas, normally the product gas, is introduced into the vertical and angles side of zone 58 to maintain the solids in a concentrated fluidized state. Aeration gas also serves to remove oils which cling to the surface of the particles which are exhausted back to the product gas loop via by-pass line 40. Particles which are entrained by the aeration gas except extreme fines lose velocity in the upper expanded section of hopper 60 and fall back to the fluidized mass of particles in the zone 58.

Particles in zone 58 are mixtures of the pyrolysis heat source and char. Where the pyrolysis heat source is char alone, the content is essentially particulate char. Standpipe or fluidizer 92 extends into zone 58 of hopper 60 and serves to sample particles at an average composition and/or particle size.

In the instance where char alone is present, the larger char particles tend to gravitate towards the base and the finer towards the top, with particles representing a cross section of the particles in leg 58 being at the middle. Thus, the particles admitted to standpipe 92 tend to represent the average particle size of the particles in leg 58.

Where leg 58 contains product char and a different high density heat source such as ash, the heavier ash particles tend to gravitate towards the bottom and the lighter char particles towards the top. By mixing with the aeration gas, the particles at the point of sampling, 94, represent composition wise, the composition of the char and ash entering hopper 62.

If the extension of standpipe 92 into hopper 60 were eliminated, the feed to standpipe 92 would tend to contain only large particles where char is only content or the heavier particles where a dense heat source is used in the pyrolysis operation. The point of sampling 94 is, as shown, screened to reject clinkers.

There is provided a second sampling tube 93 with associated feed line 95 connected through valve 97 to leg 98. This is to cover the contingency when ash is the source of heat, that the char may be fine and light, and therefore, will not readily mix with the ash. To prevent a fuel deficiency in burner 100, the light char can be drawn off the top of the bed for feed with ash to burner 100.

Standpipe 92, in cooperation with slide valve 94, controls the rate of feed of particles from hopper 60 to burner 100 which is maintained under dense fluidized conditions. The particles dispensed through slide valve 92 are transported by a nondeleterious transport gas essentially along angle rise 96 to vertical riser 98 where it is combined with a transporting flow of carrier gas or air for feed to burner 100. Fluidized leg 92 serves as a pressure seal which provides through its height, a base pressure at valve 94 greater than the operating pressure of burner 100. A pressure at valve 94 of about 1.5 to 3 times the operating pressure of burner 100 is desired to account for line losses. The typical operating pressure of burner 100 is about 10 psig. The same is true for the pressure valve 38 of fluidized leg or standpipe 40. Pyrolysis reactor 20 for this instance normally operates at a pressure of about 12 psig.

In burner 100, the particles used for pyrolysis are raised to the temperature requisite for introduction to the pyrolysis reactor by partial or total combustion. In the instance where char is a source of heat, a portion of the char is combusted in the presence of the air introduced as the transport air and/or by combustion air introduced by line 102 to burner 100. The air is preheated in exchanger 104 by the flue gas from burner 100. Where char is the inert source of heat, control may be exercised over the combustion conditions in burner 100 by limiting the amount of air introduced.

Where ash is to be employed as the heat source burner 100 must be maintained at a temperature below the sintering temperature of the ash formed as a consequence of oxidative decarbonization of char. To form ash, combustion in burner 100 is from about 80 to 100% complete, and sufficient air is introduced to achieve this end. To control combustion temperature, water is introduced along with air to convert the water into mist, to act as a uniform quench which through vaporization, absorbs the heat of combustion. In the instance of the use of ash as the heat source, burner 100 is maintained at a temperature between 1250° and 1650° F. Water requirements are maintained and controlled by valve 103.

The products from burner 100 leave by line 106 and pass through burner cyclones 108 and 110. Both cyclones are low efficiency cyclones to control the size of the particles separated from the gas streams and eliminate from them, fines. Cyclone 108 serves primarily for the separation of coarse particles and cyclone 110 for particles of intermediate size. The collected particles are transferred by the diplegs 112 and 114 to surge hopper 116.

The particles in surge hopper 116 and standpipe 40 are maintained in a dense fluidized state by the flow of fluidized gases therethrough. In the event that ash is the source of heat and combustion in the burner incomplete, air may be introduced as part of the fluidizing gas to complete combustion with controlled introduction of water as a quench. To maximize fluidized solids density combustion should be sufficient to provide an ash which is at least 90% carbon free.

Surge hopper 116 is insulated and serves as the reservoir for the hot particulate particles for feed by fluidized leg 40, angle riser 42 and vertical riser 30 to pyrolysis reactor 20. While air, if required, may be introduced to standpipe 40 as a fluidizing fluid, the gas present beyond slide valve 38 is the nondeleterious carrier gas.

For good transport, the particles in surge hopper 116, are in a particle size range between about 10 to about 2000 microns, preferably between about 20 to about 1000 microns. The fly ash or smaller particles are allowed, for the most part, to pass through the particles recovery operation. To maintain the particles in surge hopper 116 within the desired particle size range, requires some periodic manipulation of the particles in surge hopper 116. In the instance where the particles become too fine, the level of particles in surge hopper 116 is allowed to rise, this alone or in combination with the introduction of a small amount of transport gas into the dip tube of cyclone 110 serves to disrupt the operation of cyclones 108 and 110 to reduce their efficiency still further. This maximizes the size of the particulate collected by surge hopper 116 and increases the average particles size in surge hopper 116.

If, in contrast, particles tend to become too coarse, particles are withdrawn through line 118 at a rate greater than production for passage to elutriator quench drum 120. By the flow of an elutriating gas, the fines are returned by line 122 to hopper 116 to increase the overall average particle size of the particles contained in hopper 116.

Surge hopper 116 is provided with by pass line 124 to remove fines entrained by its fluidizing gas.

The product not required for return to pyrolysis reactor 120 is passed from elutriator quench drum 120 to product trim cooler 122 for withdrawal of char or ash.

The fines from burner 100, along with any fines removed with exhaust gas from hopper 116 by line 124, pass by line 126 containing velocity reduction zone 128, fines cyclone 129 and velocity reduction zone 130. After removal of settled fines from fines cyclone 129, the flue gas is used in preheater 104 prior to passage to a suitable stack.

For start up, there is employed reservoir 132 which is used to transport particulate materials to hopper 116 for initiation of the pyrolysis process. Any inert material such as sand or glass, may be used for initial start up. It is, however, supplanted later by the char or ash formed in the pyrolysis process.

The use of the double closed loop process of this invention eliminates through the fluidized legs, the need for the use of star valves and the like. While star valves can be used for hopper 60, no practical valve exists today to enable the feed of the high temperature particulate feed contained in surge hopper 116 on a continuous basis. Because the standpipe pressures are a function of particle density, the preferred particulate source of heat is the high density ash formed by decarbonization of char.

While nowise limiting, the following Example is illustrative of the presently preferred practice of the invention.

EXAMPLE

Organic solid waste after treatment of municipal solid waste to remove the inorganic constituents, is dried and comminuted to a particle size less than 8 mesh. The organic solid waste having the composition shown in Table 2 is fed at a rate of 9491.4 pounds per hour to a pyrolysis reactor using as the carrier gas a product gas of the composition shown in Table 3.

Table 2

| Component | Wt. % |
|---|---|
| Organics | 92.29 |
| Metals | 0.38 |
| Glass | 1.69 |
| Inorganics | 1.40 |
| Other Solids | 0.62 |
| Water | 3.62 |

Table 3

| Carrier Gas Composition | Vol. % |
|---|---|
| $H_2S$ | 0.31 |
| $N_2$ | 0.86 |
| $CO_2$ | 32.42 |
| CO | 31.13 |
| $H_2$ | 10.54 |
| $CH_4$ | 5.13 |
| $C_2H_4$ | 2.56 |
| $C_2H_6$ | 0.88 |
| $C_3$ | 0.88 |
| $H_2O$ | 15.28 |
| Total | 100.00 |
| Ave. M.W. | 28.43 |

The carrier gas has a temperature of 500° F and the organic solid waste to carrier gas weight ratio is 2.0. The nominal solids temperature is 100° F. Inlet pressure is 13 psig.

Simultaneously, 49,831 pounds per hour of an ash formed from decarbonization of char is transported along by about 480 pounds per hour of the carrier gas employed to the pyrolysis reactor. Ash temperature is about 1350° F. The ash for feed is maintained in surge hopper 116 at a bulk density of 60 lbs./cu. ft. Bulk density in standpipe 40 is 65 lbs./cu. ft. Bulk density is reduced to 60 lbs./cu. ft in angle riser 42 and 14.8 lbs..cu. ft. in vertical riser 30. Pressure at valve 38 is 23.5 psig.

The average temperature in pyrolysis reactor 20 is 950° F. Operating pressure is 10.5 psig. Average residence time of the organic solid waste and ash is 0.6 second.

After pyrolysis, the discharge composition from pyrolysis reactor 20 is 12,883.6 pounds per hour of gas including 3,659 pounds per hour water, 1,829.5 pounds of char, and the total ash fed to the pyrolysis reactor. The gas effluent is passed to a first product cyclone which separates 51,120 pounds per hour of solids from the gas stream and a second cyclone which separates 269 pounds per hour of solids from the gas stream. The balance of the gas stream advances to fine cyclone which separate 207 pounds per hour of essentially fine char, as product from the gas stream. After quench separation of pyrolytic oil, the residual gas stream at a rate of 13,419 pounds per hour, is made available as a heating gas and gas for the process. The excess is flared to the atmosphere. The composition of the pyrolytic oil and char is shown in Table 4.

Table 4

| DRY CHAR AND DRY PYROLYTIC PRODUCT COMPOSITIONS (WT. %) | | |
|---|---|---|
| | Char | Oil |
| Carbon | 48.8 | 57.0 |
| Hydrogen | 3.3 | 7.7 |
| Nitrogen | 1.1 | 1.1 |
| Sulfur | 0.2 | 0.2 |
| Chlorine | 0.3 | 0.2 |
| Ash | 33.0 | 0.2 |
| Oxygen | 13.3 | 33.6 |

The physical properties and particle size distribution of the ash and char fed to the product cyclones is shown in Table 5.

Table 5

| | Ash | Virgin Char |
|---|---|---|
| Composition, wt. % | 96.5 | 3.5 |
| Particle density, lbs/ft$^3$ | 150.0 | 112.0 |
| Skeletal density, lbs/ft$^3$ | 150.0 | 150.0 |
| Settled bulk density, lbs/ft$^3$ | 58 | 12.5 |
| Size Distribution, wt. % | | |
| 0 ~ 10 microns | 1.2 | 34.0 |
| 10 ~ 20 | 7.8 | 24.0 |
| 20 ~ 40 | 13.0 | 19.0 |
| 40 ~ 80 | 16.0 | 10.0 |
| 80 ~ 120 | 18.0 | 4.0 |
| 120 ~ 160 | 13.0 | 2.0 |
| 160 ~ 200 | 10.0 | 1.5 |
| 200 ~ 400 | 15.0 | 2.5 |
| 400 ~ 600 | 2.5 | 1.2 |
| 600 ~ 1000 | 2.0 | 1.1 |
| 1000 ~ 2000 | 1.5 | 0.7 |
| 2000 | 0.0 | 0.0 |

Of the particles 99.96% are received as an ash char mixture and the balance as fine char product.

Of the mixture of ash and char collected in the ash stripper 60, solids are removed at a rate of 51,388 pounds per hour, and fed to burner 100. Solids density is ash stripper 60 is 50 lbs./cu. ft. The solids density in standpipe 92 is 55 lbs./cu. ft and is reduced to 50 lbs./cu. ft in angle riser 96 and to 16 lbs./cu. ft by diluting air in vertical riser 98. Static pressure at valve 94 is 22 psig. Nominal operating pressure of burner 100 is 9.3 psig.

Decarbonization of the char by oxidation in burner 100 is at an average burner temperature of 1350° F. Char is supplied in excess of that required to achieve total decarbonization in char burner 100. To maintain burner temperature, water is fed as a fog to burner 100 at a rate of 2904 lbs./hr. The resultant ash and gases are passed to a first burner cyclone which separate ash at the rate of 49,914 pounds per hour and then to a second burner cyclone 34 which receives ash at the rate of 306 pounds per hour. The ash collects in hopper 116 and is maintained at the ash particle size shown in Table 5. Residual gas stream containing 120 pounds per hour of fines is passed to a fines accumulator. The ash collected in ash storage hopper is withdrawn as product net recovery rate of 84 pounds per hour. The flue gas from the char burner is employed to preheat the air required for combustion. In this instance the air is heated to a temperature of 650° F by indirect heat exchange with flue gas following which the flue gas is flared to the atmosphere. In the operation, nominal residence time in the pyrolytic reactor is 0.3 second, and in burner 100 0.6 second. Average residence time of solids in ash stripper is 3 minutes and the ash surge hopper 5.5 minutes.

What is claimed is:

1. A loop process for pyrolysis of organic solid waste which comprises continuously:

a. pyrolyzing particulate organic solid waste having a maximum particle dimension less than 1 inch by combining and passing the particulate organic solid waste and a hot particulate source of heat selected from the group consisting of a carbon containing solid residue of pyrolysis, an inorganic heat source formed from decarbonization of the carbon containing solid residue of pyrolysis and mixtures thereof, with a fluidizing transport carrier gas which is nondeleteriously reactive with respect to the products of pyrolysis through a transport flash pyrolysis zone under turbulent flow conditions for a time sufficient to pyrolyze the organic solid waste to the carbon containing solid residue of pyrolysis, pyrolytic oils and gases, said flash pyrolysis zone being maintained at an operating pressure above atmospheric and at an operating temperature between about 600° F and the introduction temperature of the particulate heat source to said pyrolysis zone;

b. withdrawing a fluidized mixture of the carrier gas, particulate source of heat, the carbon containing solid residue of pyrolysis, pyrolytic oils and gas from the flash pyrolysis zone;

c. separating the particulate source of heat and the carbon containing solid residue of pyrolysis from the fluidized mixture and collecting the separated particulate source of heat and carbon containing solid residue of pyrolysis in a first particles collection zone wherein the particles are maintained in a dense fluidized state;

d. withdrawing from the first particles collection zone a dense fluidized mixture of the particulate source of heat and carbon containing solid residue of pyrolysis through a first vertically oriented fluidized leg coupled to a first solids transport conduit connected to a fluidized solids transport burner, the particles in said first fluidized leg providing at the base thereof, a static pressure greater than the operating pressure of the fluidized solids transport burner;

e. transporting the withdrawn particulate mixture through said first solids transport conduit to said fluidized solids transport burner;

f. decarbonizing at least a portion of the carbon containing solid residue of pyrolysis in said fluidizing char transport burner to form the particulate source of heat at a temperature at least sufficient for feed to said pyrolysis zone;

g. removing the formed particulate source of heat from the fluidized solids transport burner and collecting a portion of the formed particulate source of heat in a second particles collection zone; and h. withdrawing from the second particles collection zone particulate source of heat to a second vertically oriented fluidized leg coupled to a second solids transport conduit connected to said transport flash pyrolysis zone and transporting under fluidized conditions the withdrawn particulate source of heat to said transport flash pyrolysis zone, the height of the particulate static source in said second fluidized leg being sufficient to maintain a static pressure at the base of said second fluidized leg greater than the operating pressure of the flash pyrolysis zone.

2. The process of claim 1 in which the particulate source of heat is the inorganic heat source formed from decarbonization of the carbon containing solid residue of pyrolysis and said pyrolysis zone is maintained at a temperature from about 600° F to about 1700° F and said inorganic heat source is formed by decarbonization of the carbon containing solid residue of pyrolysis in said fluidized solids transport burner at a temperature below the fusion temperature of said inorganic heat source.

3. The process of claim 2 in which at least 80% of the carbon containing solid residue of pyrolysis is decarbonized in said fluidized solids transport burner.

4. The process of claim 2 in which said pyrolysis zone is maintained at a temperature from about 800° to about 1400° F.

5. The process of claim 1 in which the carrier gas is the gas formed by pyrolysis of the solid organic waste.

6. The process of claim 2 in which the carbon containing solid residue of pyrolysis and char are withdrawn from said first particles collection zone at a composition approximate that of the composition of said carbon containing solid residue of pyrolysis and inorganic heat source exiting said pyrolysis zone.

7. the process of claim 1 in which the particulate source of heat is the carbon containing solid residue of pyrolysis and said pyrolysis zone is maintained at a temperature from about 600° to about 2000° F.

8. The process of claim 1 in which the particulate source of heat is of a particle size from about 10 and 2000 microns.

9. The process of claim 1 in which the particulate source of heat is of a particle size from about 20 to about 1000 microns.

10. The process of claim 1 in which the weight ratio of the particulate source of heat to the organic solid waste fed to said pyrolysis zone is from about 2 to 1 to about 10 to 1.

11. The process of claim 1 in which the weight ratio of the particulate source of heat to the organic solid waste fed to said pyrolysis zone is from about 4 to 1 to about 5 to 1.

12. The process of claim 1 in which residence time of particles in the pyrolysis zone is from 0.1 to about 2 seconds.

13. The process of claim 1 in which residence time of particles in the pyrolysis zone is from about 0.1 to about 1 second.

14. The process of claim 1 in which the pressure at the base of the first fluidized leg is greater than the pressure in said fluidized solids transport burner, and the pressure at the base of the second fluidized leg is greater than the pressure of said flash pyrolysis zone.

15. The process of claim 1 in which the particulate solid organic waste is of a particle size less than about 5 mesh.

16. The process of claim 1 in which the particulate solid organic waste is of a particle size less than about 8 mesh.

* * * * *

UNITED STATES PATENT AND TRADEMARK OFFICE
CERTIFICATE OF CORRECTION

PATENT NO. : 4,078,973

DATED : March 14, 1978

INVENTOR(S) : Charles K. Choi, et al

It is certified that error appears in the above-identified patent and that said Letters Patent are hereby corrected as shown below:

```
      Column 3, line 32, after "to" delete -- and --;
line 46, after "operations." delete "b" and insert
-- " --.  Column 6, line 30, change "descent" to
-- descend --.  Column 12, line 46, Claim 11, change
"5" to -- 6 --.
```

Signed and Sealed this

Fourth Day of July 1978

[SEAL]

Attest:

RUTH C. MASON
Attesting Officer

DONALD W. BANNER
Commissioner of Patents and Trademarks